(12) United States Patent
Lin et al.

(10) Patent No.: US 9,303,527 B2
(45) Date of Patent: Apr. 5, 2016

(54) HUB COOLING APPARATUS ADAPTED TO WIND-POWER GENERATOR AND METHOD THEREOF

(71) Applicant: INDUSTRIAL TECHNOLOGY RESEARCH INSTITUTE, Hsin-Chu (TW)

(72) Inventors: Jung-Kuei Lin, Hsinchu (TW); Yun-Yuan Chang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 557 days.

(21) Appl. No.: 13/779,088

(22) Filed: Feb. 27, 2013

(65) Prior Publication Data

US 2014/0154048 A1 Jun. 5, 2014

(30) Foreign Application Priority Data

Nov. 30, 2012 (TW) .............................. 101145058 A (51) Int. Cl.
*F03D 11/00* (2006.01)
*F01D 25/12* (2006.01)

(52) U.S. Cl.
CPC ................ *F01D 25/12* (2013.01); *F03D 11/00* (2013.01); *F05B 2260/20* (2013.01); *Y02E 10/722* (2013.01)

(58) Field of Classification Search
CPC ... F03D 11/005; F03D 11/0075; F01D 25/12; F05B 2260/20
See application file for complete search history.

(56) References Cited

U.S. PATENT DOCUMENTS

| 2,790,596 A * | 4/1957 | Stirling ................. F04D 25/166 |
| | | 416/193 R |
| 4,143,522 A | 3/1979 | Hamrick et al. |
| 8,227,932 B2 | 7/2012 | Murata et al. |
| 2008/0025847 A1 | 1/2008 | Teipen |
| 2009/0060748 A1 | 3/2009 | Landa et al. |
| 2010/0148514 A1 | 6/2010 | Sato et al. |
| 2011/0254280 A1* | 10/2011 | Hirai ....................... F03D 11/00 |
| | | 290/55 |
| 2012/0074711 A1 | 3/2012 | Sato et al. |
| 2012/0148407 A1 | 6/2012 | Akashi et al. |

FOREIGN PATENT DOCUMENTS

| CA | 2763082 A1 | 12/2010 |
| CN | 1279746 A | 1/2001 |
| CN | 102112739 A | 6/2011 |
| JP | 2010159663 A | 7/2010 |
| TW | 200920938 A | 5/2009 |
| TW | 200925411 A | 6/2009 |

(Continued)

OTHER PUBLICATIONS

Papa et al., "Numerical heat transfer predictions and mass/heat transfer measurements in a linear turbine cascade", Applied Thermal Engineering, vol. 27, pp. 771-778, 2007.

(Continued)

*Primary Examiner* — Mary A Davis
(74) *Attorney, Agent, or Firm* — Rabin & Berdo, P.C.

(57) ABSTRACT

A hub cooling apparatus adapted to a wind generator has a circulating fan module installed in a nosed end of a hub and a wind guiding module installed in a main shaft of a nacelle; wherein the circulating fan module is driven by the rotating hub, the wind guiding module is driven by the rotating main shaft.

23 Claims, 8 Drawing Sheets

(56) References Cited

FOREIGN PATENT DOCUMENTS

| | | |
|---|---|---|
| TW | 201026951 A | 7/2010 |
| TW | 201144589 A | 12/2011 |

OTHER PUBLICATIONS

Yuen et al., "Film cooling characteristics of a single round hole at various streamwise angles in a crossflow: Part I effectiveness", International Journal of Heat and Mass Transfer, vol. 46, pp. 221-235, 2003.

Smaili et al., "Thermal analysis of wind turbine nacelle operating in Algerian Saharan climate", Energy Procedia, vol. 18, pp. 187-196, 2012.

Stafford et al.,"The effect of global cross flows on the flow field and local heat transfer performance of miniature centrifugal fans", International Journal of Heat and Mass Transfer, vol. 55, No. 7-8, pp. 1970-1985, Mar. 2012.

Arens et al., "A study of occupant cooling by personally controlled air movement", Energy and Buildings, vol. 27, pp. 45-59, 1998.

China Patent Office, Office Action issued on Nov. 23, 2015.

* cited by examiner

HUB COOLING APPARATUS ADAPTED TO WIND-POWER GENERATOR AND METHOD THEREOF

CROSS REFERENCE TO RELATED APPLICATION

This application also claims priority to Taiwan Patent Application No. 101145058 filed in the Taiwan Patent Office on Nov. 30, 2012, the entire content of which is incorporated herein by reference.

TECHNICAL FIELD

The present disclosure relates to a hub cooling apparatus adapted to a wind power generator and method thereof, and more particularly, to an apparatus and method for reducing the temperature of a hub in a wind-power generator.

BACKGROUND

Recently, with the growing in global environmental awareness, there is a steady increase in the research of green energy as it is an energy that can be extracted, generated, and/or consumed without any significant negative impact to the environment. On representative source of green energy is the wind power.

Currently, the harvesting of wind power is enabled by the use of wind turbine, which is generally composed of a tower, a nacelle, a generator module and a blade module. Basically, the nacelle is arranged at the top of the tower while allowing the generator module to be received inside the nacelle, whereas the blade module is disposed an end of the nacelle and is coupled to the generator module though a rotation shaft. Thereby, the blade module that is being driven to rotate by wind can bring along the rotation shaft of the generator module to rotate and thus active the generator module to generate electricity.

Although the electricity generated by wind turbine is a good source of green energy, the whole structure of the wind turbine usually is pretty heavy and can be constructed in a height ranged between 25 m and 100 m, resulting that it is very difficult to maintain. Moreover, since hub is a confined space having a plurality of components disposed and operating therein, such as a pitch angle controller and a pitch motor, the heat resulting from the operation of those components may be trapped inside the hub and can not be dissipated easily, those components inside the hub may suffer a higher-than-usual damage rate. For instance, due to the stagnation of air flow inside the hub, components inside the hub, such as a pitch angle controller and a pitch motor, can be damaged by the high-temperature air trapped inside the hub.

Therefore, in view of the maintenance difficulty and poor heat dissipation ability of those conventional wind turbines, it is in need of an improve wind power generator that is easy to maintain and also is able to dissipate heat effectively.

SUMMARY

In an exemplary embodiment, the present disclosure provides a hub cooling apparatus, adapted to a wind power generator, comprising: a circulating fan module installed in a nosed end of a hub and a wind guiding module installed in a main shaft of a nacelle; wherein the circulating fan module is driven by the rotating hub, the wind guiding module is driven by the rotating main shaft In another exemplary embodiment, the present disclosure provides a hub cooling method, adapted to a wind power generator, comprising the steps of: enabling a circulating fan module to be driven to operate by a rotating hub while allowing air in the hub to be driven to flow and circulate by the operation of the circulating fan module; and activating a first fan and a second fan that are both arranged inside a nacelle for drawing hot air inside the hub to flow into the nacelle while forcing cold air inside the nacelle to be flow into the hub.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
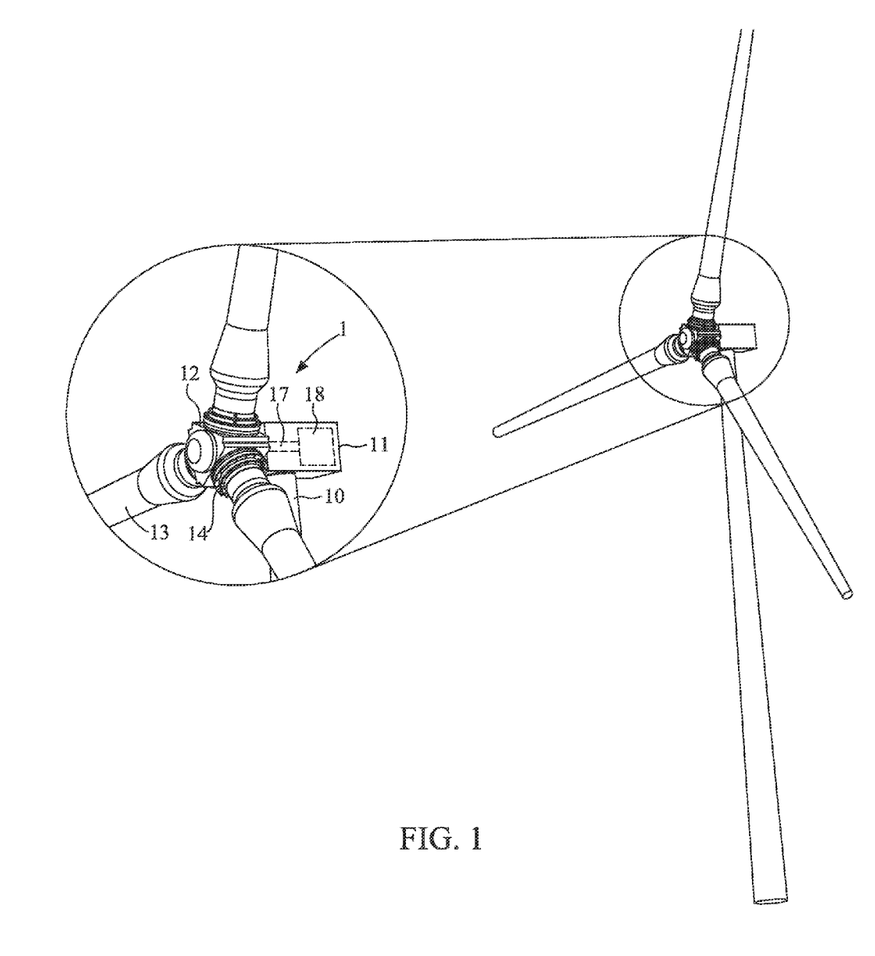
FIG. 1 is a three-dimensional view of a hub cooling apparatus adapted to a wind power generator according to the present disclosure.
Figure 2:
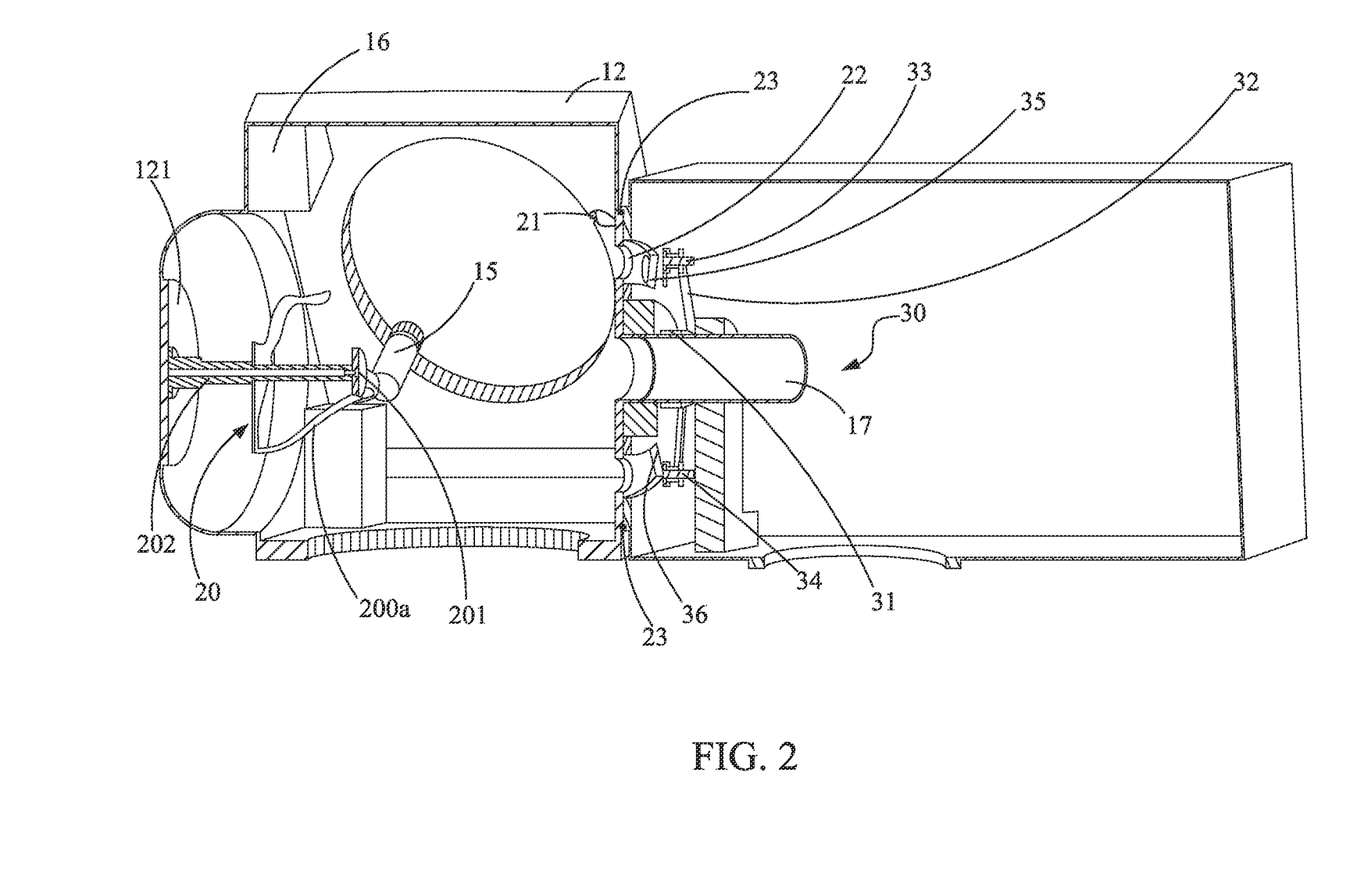
FIG. 2 is a cross sectional diagram showing a hub cooling apparatus of the present disclosure that is adapted to be received inside an integral structure of a hub and a nacelle.

Please refer to FIG. 1, which is a three-dimensional view of a hub cooling apparatus adapted to a wind power generator according to the present disclosure. Please refer to FIG. 2, which is a cross sectional diagram showing a hub cooling apparatus of the present disclosure that is adapted to be received inside an integral structure of a hub and a nacelle. As shown in FIG. 1 and FIG. 2, the wind power generator 1 is composed of a tower 10, a nacelle 11, a hub 12, a plurality of blades 13, a plurality of hub seals 14, a plurality of pitch motor 15, a plurality of pitch angle controller 16, a main shaft 17 and a generator set 18, in which the nacelle 11 is arranged at the top of the tower 10; the hub 12 is coupled to an end of the nacelle 11; the plural blades 13 are coupled to an end of the hub 12 away from the nacelles 11; each of the plural hub seals 14 is disposed at a position between its corresponding blade 13 and the hub 12 for preventing external moisture from entering into the hub 12 or internal lubricating oil from leaking; each of the pitch motors 15 is arranged at a position between its corresponding hub seal 14 and the hub 12 for controlling the wind receiving angle of its corresponding blades 13; the plural pitch angle controllers 16 are is disposed inside the hub 12 while electrically connected to the plural pitch motors 15 for controlling the same; the main shaft 17 is arranged inside the nacelle 11 while allowing an end of the main shaft 17 to coupled to the hub 12; and the generator set 18 is arranged inside the nacelle 11 while allowing the generator set 18 to coupled to an end of the main shaft 17 that is not coupled to the hub 12.

Please refer to FIG. 2, which is a cross sectional diagram showing a hub cooling apparatus of the present disclosure that is adapted to be received inside an integral structure of a hub and a nacelle. As shown in FIG. 2, the hub cooling apparatus comprises: a circulating fan module 20, a flow guiding ring 21, a plurality of through holes 22, a wind guiding module 30, a first interface hole 35 and a second interface hole 36, in which the circulating fan module 20 is arranged inside the hub nose 121 of the hub 12 while allowing the circulating fan module 20 to be brought along to rotate with the rotation of the hub 12 about the same axis of the main shaft 17, and also the circulating fan module 20, being arranged at an end of the hub away from the nacelle 11, is configured with a first fan unit 200a. In this embodiment, the first fan unit 200a is a fan with helical blades.

Figure 3:
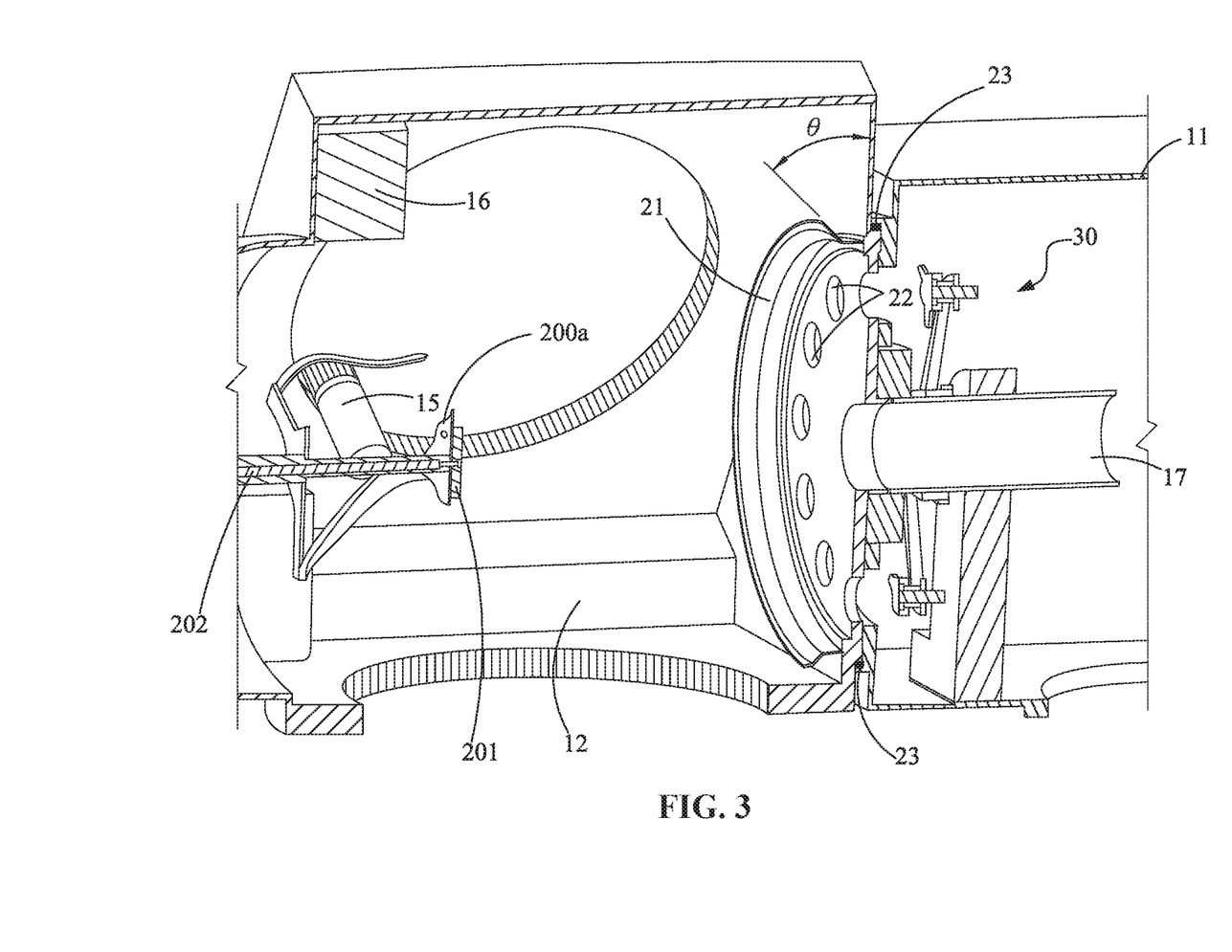
FIG. 3 is a three-dimensional diagram showing a portion of a flow guiding ring and a wind guiding module used in the present disclosure.

Please refer to FIG. 3, which is a three-dimensional diagram showing a portion of a flow guiding ring and a wind guiding module used in the present disclosure. As shown in FIG. 3, the flow guiding ring 21 is received inside the hub 12 at an end thereof neighboring to the nacelle 11 while allowing the peripheral wall of the flow guiding ring 21 to incline by an inclination angle θ with respect to the wall of the hub 12. In an embodiment, the inclination angle θ is ranged between 30 degrees to 75 degrees.

In addition, the trough holes 22 are formed at an end of the hub 12 that is neighboring to the nacelle 11 and in an area enclosed by the flow guiding ring 21 and a seal element 23. It is noted that he plural through holes are distributed in a ring-like formation.

Figure 4:
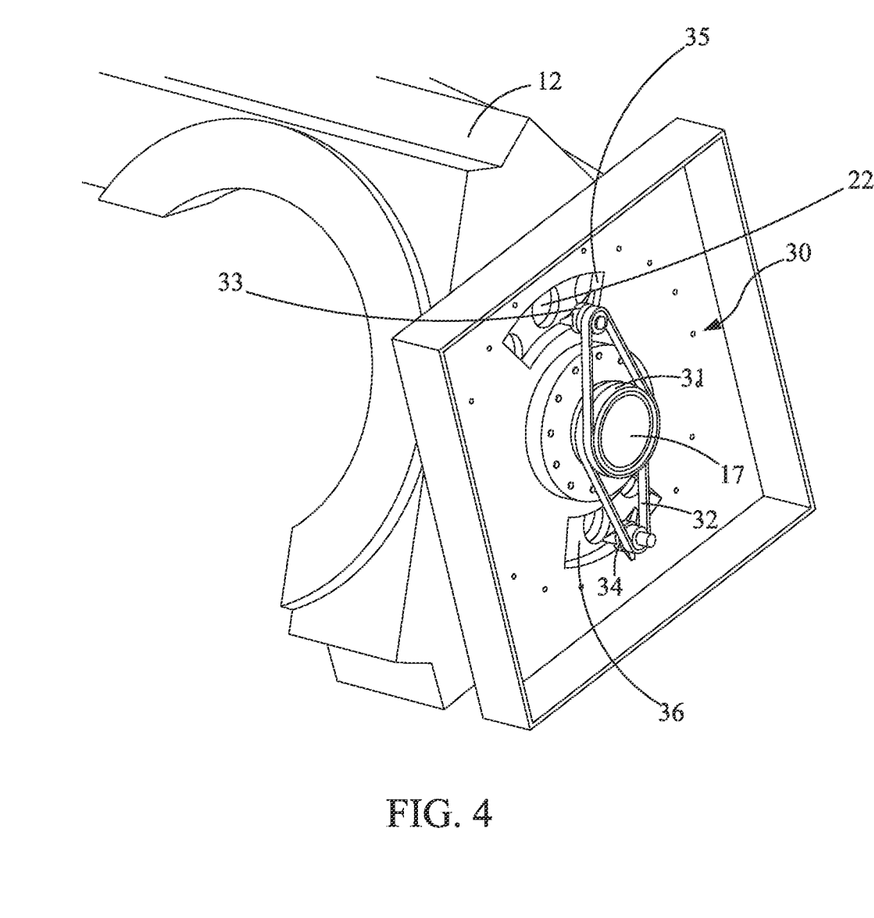
FIG. 4 is a three-dimensional diagram showing a wind guiding module that is disposed inside a nacelle according to an embodiment of the present disclosure.

Please refer to FIG. 4, which is a three-dimensional diagram showing a wind guiding module that is disposed inside a nacelle according to an embodiment of the present disclosure. As shown in FIG. 4, the wind guiding module 30 is arranged inside the nacelle 11 at an end thereof that is neighboring to the hub 12, and is configured with a driving ring 31, two belts 32, a first fan 33 and a second fan 34.

Figure 5:
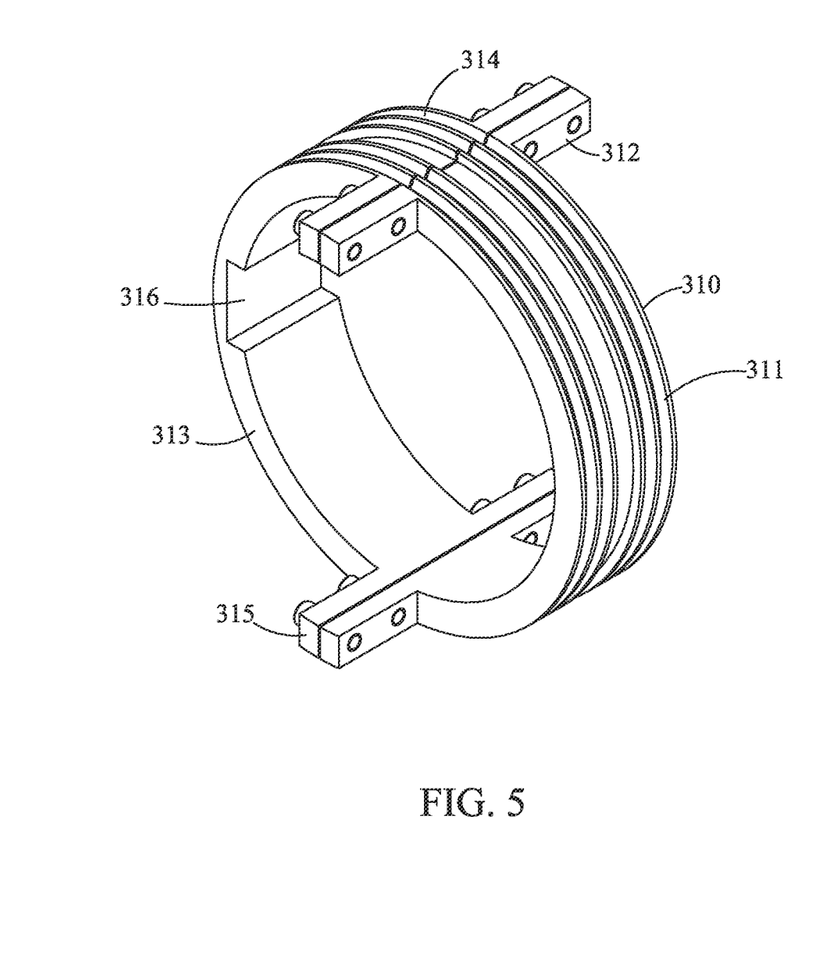
FIG. 5 is a three-dimensional diagram showing a driving ring used in the present disclosure.

In the embodiment shown in FIG. 5, the driving ring 31 is composed of a first half-ring 310 and a second half-ring 313. The first half-ring 310 is formed with two first grooves 311 on a peripheral surface of the first half-ring 310, and the second half-ring 313 is formed with two second grooves 314 on a peripheral surface of the second half-ring 313. Moreover, the first half-ring 310 has two first couplers 312 formed on a side thereof, and the second half-ring 313 has two second couplers 315 formed on a side thereof. In addition, the second half-ring 313 is formed with an inset notch 316 on another peripheral surface thereof that is opposite to the one where the two second grooves 314 are formed.

By coupling the first couplers 312 to their corresponding second couplers 315, the first half-ring 310 can be connected to the second half-ring 313 in an end-to-end manner into a complete ring while simultaneously allowing the two first grooves 311 to couple to the two second grooves 314 also in an end-to-end manner in respective so as to form two corresponding ring-like grooves.

Figure 6:
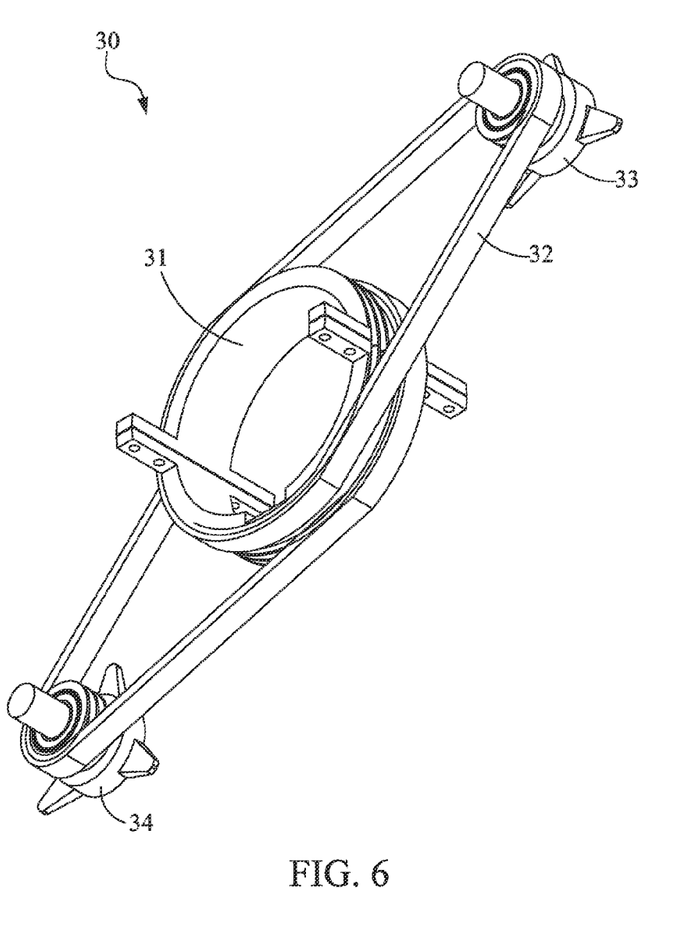
FIG. 6 a three-dimensional diagram showing a wind guiding module used in the present disclosure.

As shown in FIG. 3 and FIG. 6, the driving ring 31 is mounted on the main shaft 17, and the two belts 32 are respectively mounted on the ring-like grooves of the driving ring 31, the first fan 33 and the second fan 34. In addition, the driving ring 31 is an integrally formed ring; the angle of inclination for each blade of the first fan 33 is opposite to that of each blade of the second fan 34. Moreover, the first fan 33 can be used as a suction fan while the second fan 34 can be used as an exhaust fan, or vice versa.

In this embodiment, the main shaft 17 is wedged into the inset notch 316 while allowing an inset block that is formed on the main shaft 17 at a position corresponding to the inset notch 316 is inset into the inset notch 316, by that when the main shaft 17 is being driven to rotate, the driving ring 31 will be brought along to rotate with the rotation of the main shaft 17.

The first interface hole 35 and the second interface hole 36 are formed respectively at on an end of the nacelle 11 that is neighboring to the hub 12 while allowing the first interface hole 35 and the second interface hole 36 to be selectively in flow communication with their respective corresponding through holes 22. In addition, the first interface hole 35 is disposed at a position between the through hole 22 and the first fan 33, and the second interface hole 36 is disposed at a position between the through hole 22 and the second fan 34.

Operationally, when the blades 13 are driven to rotate by wind, the hub 12 will be brought along to rotate along by the blades 13, and the rotating hub 12 can also bring along the main shaft 17 and the circulating fan module 20 to rotate as well, whereas the circulating fan module 20 and the main shaft 17 are rotating about the same axis and the air circulation inside the hub 12 is enhanced by the rotation of the circulating fan module 20 so as to prevent any components inside the hub 12 from overheat.

By the transmission of the two belts 32, the rotating main shaft 17 is able to bring along the first fan 33 and the second fan 34 to rotate accordingly. Moreover, in a condition when the first fan 33 is used as a suction fan for sucking hot air from the hub 12 to the nacelle 11 through the first interface hole 35 and the through hole 22, and the second fan 34 is used as an exhaust fan for forcing cold air in the nacelle 11 to flow into the hub 12 through the second interface hole 36 and the through holes 22; and vice versa, in a condition when the first fan 33 is used as an exhaust fan for forcing cold air in the nacelle 11 to flow into the hub 12 through the first interface hole 35 and the through holes 22, and the second fan 34 is used as a suction fan for sucking hot air from the hub 12 to the nacelle 11 through the second interface hole 36 and the through hole 22. Thereby, by the hot air and cold air that are circulating between the hub 12 and the nacelle 11, the heat generated from the operating components inside the hub 12 can be dissipated.

Figure 7:
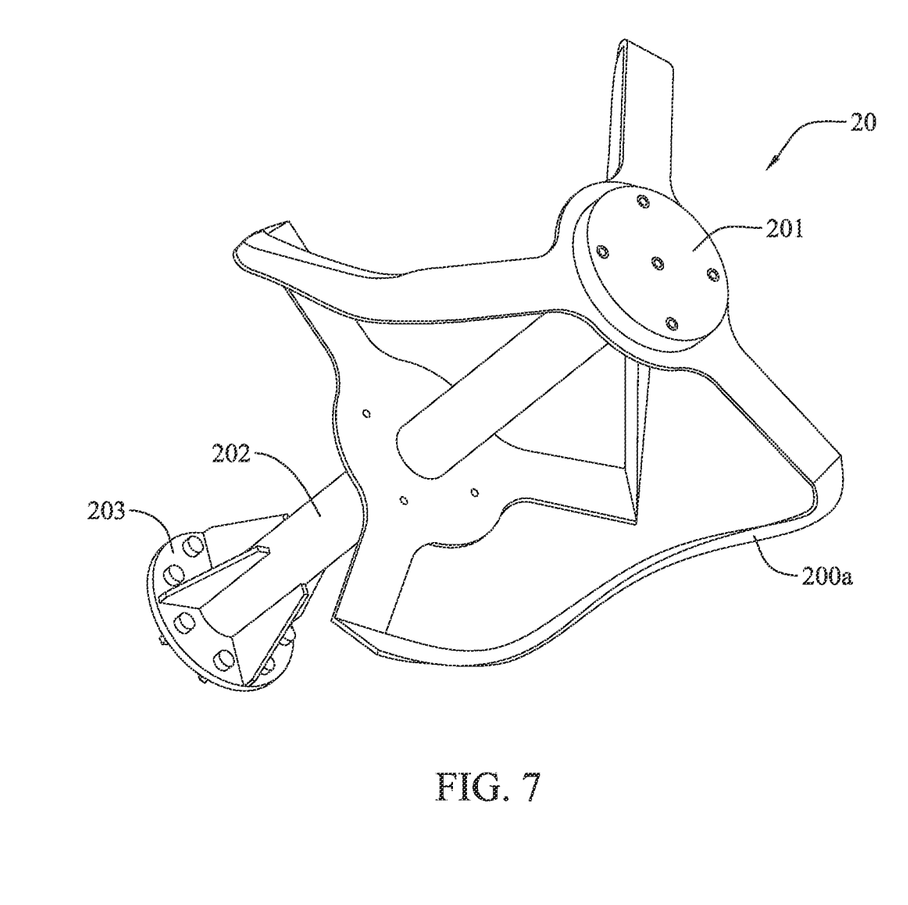
FIG. 7 a three-dimensional diagram showing a circulating fan module used in the present disclosure.
Figure 8:
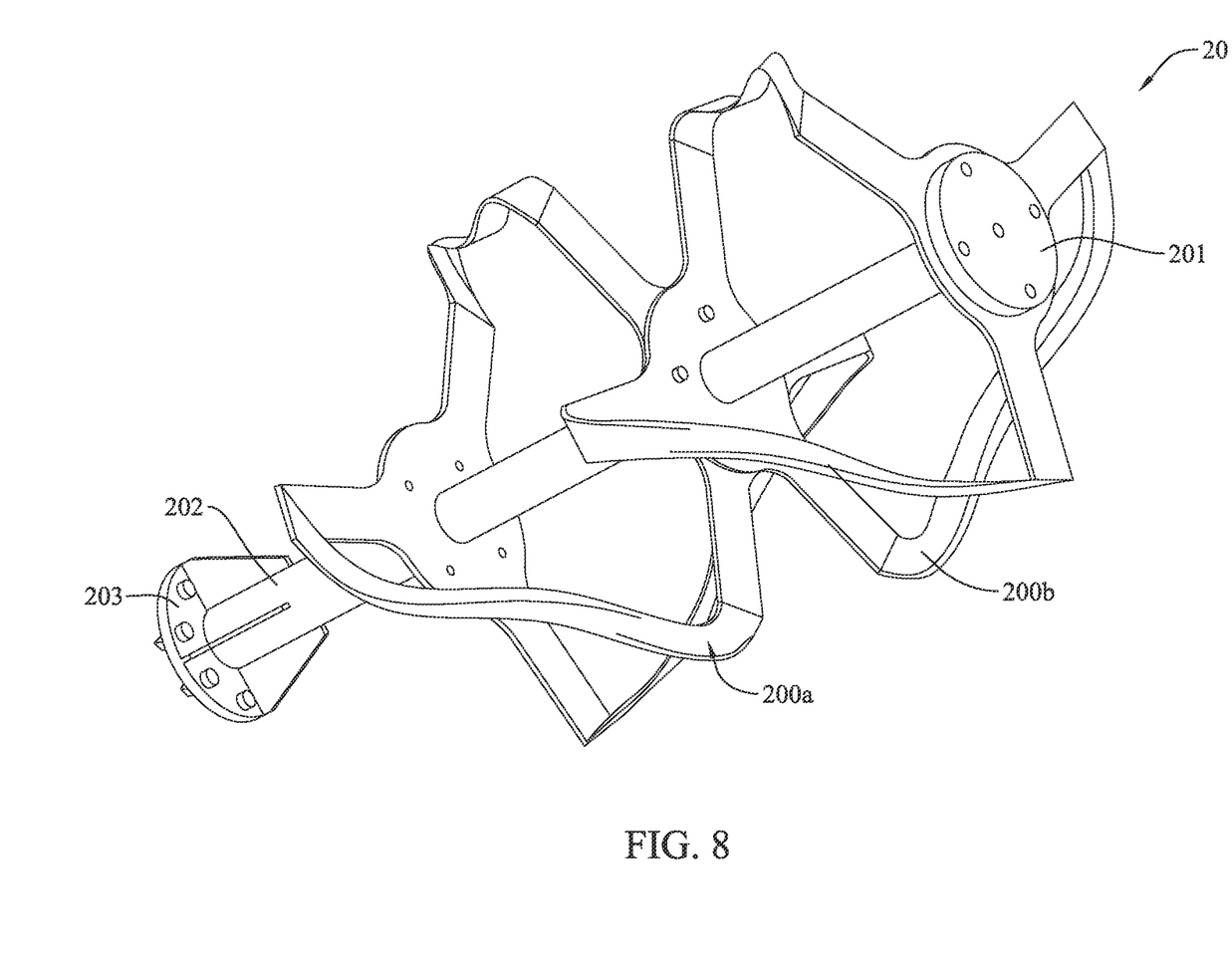
FIG. 8 is a three-dimensional diagram showing a circulating fan module composed of a plurality of fan units according to the present disclosure.

Please refer to FIG. 7 and FIG. 8, which are schematic diagrams shown two exemplary circulating fan modules used in the present disclosure. It is noted that the circulating fan module 20 further comprises at least one first fan unit 200a, at least one second fan unit 200b, and a fan support 202, in which the fan support 202 is formed with two ends that are provided for a fan base 203 and a blade clamper 201 to be disposed thereat in respective, and each first fan unit 200a is coupled to at least one second fan unit 200b at a side thereof, and is formed structurally the same as the second fan unit 200b.

As shown in FIG. 2, FIG. 7 and FIG. 8, the fan base 203 of the first fan unit 200a is coupled to the hub nose 121 of the hub 12. In an embodiment when there is a plurality of first fan unit 200a, each first fan unit 200a is coupled to at least one second fan unit 200b at a side thereof while allowing each of the at least one second fan unit 200b to be fixed secured by the use of a blade damper 201.

In an embodiment, the present disclosure further provides a hub cooling method, being adapted to the wind power generator shown in FIG. 2, which comprises the steps of: enabling a circulating fan module 20 to be driven to operate by a rotating hub 12 while allowing air in the hub 12 to be driven to flow and circulate by the operation of the circulating fan module 20; and activating a first fan 33 and a second fan 34 that are both arranged inside a nacelle 11 for drawing hot air inside the hub 12 to flow into the nacelle 11 while forcing cold air inside the nacelle 11 to be flow into the hub 12.

Operationally, when the blades 13 are driven to rotate by wind, the hub 12 will be brought along to rotate along by the blades 13, and the rotating hub 12 can also bring along the main shaft 17 and the circulating fan module 20 to rotate as well, whereby the air circulation inside the hub 12 is enhanced by the rotation of the circulating fan module 20 so as to prevent any components inside the hub 12 from overheat.

Moreover, in a condition when the first fan 33 is used as a suction fan for sucking hot air from the hub 12 to the nacelle 11 through the first interface hole 35 and the through hole 22, and the second fan 34 is used as an exhaust fan for forcing cold air in the nacelle 11 to flow into the hub 12 through the second interface hole 36 and the through holes 22; and vice versa, in a condition when the first fan 33 is used as an exhaust fan for forcing cold air in the nacelle 11 to flow into the hub 12 through the first interface hole 35 and the through holes 22, and the second fan 34 is used as a suction fan for sucking hot air from the hub 12 to the nacelle 11 through the second interface hole 36 and the through hole 22. Thereby, by the hot air and cold air that are circulating between the hub 12 and the nacelle 11, the heat generated from the operating components inside the hub 12 can be dissipated.

To sum up, the hub cooling apparatus of the present disclosure is basically a structure composed of a wind guiding module 30 and a circulating fan module 20 that are disposed respectively inside a nacelle and a hub while allowing the wind guiding module 30 and the circulating fan module 20 to be activated to operate respectively by the rotating main shaft 17 and the rotating hub 12, whereas the main shaft 17 and the hub 12 are directly or indirectly being driven to rotate by the rotating blades 13 as the blades 13 are driven to rotate by wind. Thereby, both the wind guiding module 30 and the circulating fan module 2 can be activated to operate without additional power module.

By the operating of the wind guiding module 30, cold air can be sucked to flow from the nacelle 11 into the hub 12, while enabling hot air in the hub 12 to flow into the nacelle 11, and simultaneously, the air circulation inside the hub 12 is enhanced by the rotation of the circulating fan module 20 so as to prevent any components inside the hub 12 from overheat.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A hub cooling apparatus adapted for a wind-power generator, comprising:
   a circulating fan module installed in a nosed end of a hub;
   a wind guiding module installed to in a main shaft of a nacelle, the wind guiding module including:
     a driving ring,
     two belts,
     a first fan, and
     a second fan;
   the driving ring being mounted on the main shaft and allowing the two belts to be respectively mounted on the driving ring, the first fan and the second fan;
   wherein the circulating fan module is driven by the rotating hub, and the wind guiding module is driven by the rotating main shaft.

2. The hub cooling apparatus of claim 1, wherein the driving ring is an integrally formed ring.

3. The hub cooling apparatus of claim 1, wherein the driving ring is formed with an inset notch on a surface thereof for allowing the main shaft to wedge therein.

4. The hub cooling apparatus of claim 1, wherein the driving ring is composed of a first half-ring and a second half-ring;
   the first half-ring is coupled to the second half-ring in an end-to-end manner; the first half-ring is formed with two first grooves on a peripheral surface of the first half-ring;
   the second half-ring is formed with two second grooves on a peripheral surface of the second half-ring; and
   the two first grooves are arranged coupling to the two second grooves in an end-to-end manner in respective so as to form two corresponding ring-like grooves.

5. The hub cooling apparatus of claim 4, wherein the first half-ring has two first couplers formed on a side thereof, and the second half-ring has two second couplers formed on a side thereof, thereby, the two first couplers and the two second couplers are arranged coupling to one another so as to connect the first half-ring to the second half-ring into the complete drive ring.

6. The hub cooling apparatus of claim 5, wherein the second half-ring is formed with an inset notch on another peripheral surface thereof that is opposite to the one where the two second grooves are formed for allowing the main shaft to wedge therein.

7. The hub cooling apparatus of claim 1, wherein the angle of inclination for each blade of the first fan is opposite to that of each blade of the second fan.

8. The hub cooling apparatus of claim 1, wherein the circulating fan module further comprises at least one first fan unit, and each first fan unit is coupled to at least one second fan unit at a side thereof while allowing each of the at least one second fan unit to be fixed secured by the use of a blade clamper.

9. The hub cooling apparatus of claim 8, wherein each of the first and the second fan unit is a helical fan.

10. The hub cooling apparatus of claim 8, wherein the circulating fan module has an axially extending fan support, and the fan support is formed with two ends that are provided for a fan base and the blade clamper to be disposed on the respective ends.

11. The hub cooling apparatus of claim 8, wherein the circulating fan module and the main shaft are rotating about the same axis.

12. The hub cooling apparatus of claim 1, further comprising:
a flow guiding ring, arranged inside the hub at an end neighboring to the nacelle.

13. The hub cooling apparatus of claim 12, wherein the peripheral wall of the flow guiding ring is inclined by an inclination angle with respect to the wall of the hub.

14. The hub cooling apparatus of claim 13, wherein the inclination angle is ranged between 30 degrees to 75 degrees.

15. The hub cooling apparatus of claim 12, further comprising:
a plurality of through holes, being formed on an end of the hub that is neighboring to the nacelle and inside an area enclosing by the flow guiding ring.

16. The hub cooling apparatus of claim 15, wherein the plural through holes are distributed in a ring-like formation.

17. The hub cooling apparatus of claim 15, further comprising: a first interface hole and a second interface hole; wherein the first and the second interface holes are formed respectively at an end of the nacelle that is neighboring to the hub while allowing the first interface hole and the second interface hole to be selectively in flow communication with their respective corresponding plurality of through holes.

18. The hub cooling apparatus of claim 17, wherein the first and the second interface holes are arranged at positions opposite to each other.

19. The hub cooling apparatus of claim 17, wherein the first fan is arranged at a position corresponding to the first interface hole, while the second fan is arranged at a position corresponding to the second interface hole.

20. A hub cooling method, adapted to a wind power generator, comprising the steps of:
enabling a circulating fan module to be driven to operate by a rotating hub while allowing air in the hub to be driven to flow and circulate by the operation of the circulating fan module; and
activating a first fan and a second fan that are both arranged inside a nacelle for drawing hot air inside the hub to flow into the nacelle while forcing cold air inside the nacelle to be flow into the hub;
wherein the first fan is an exhaust fan for forcing cold air in the nacelle to flow into the hub through a first interface hole formed in the nacelle and a plurality of through holes formed in a flow guiding ring, and the second fan is a suction fan for sucking hot air from the hub to the nacelle through a second interface hole formed in the nacelle and the plurality of through holes; or vice versa, the first fan is a suction fan for sucking hot air from the hub to the nacelle through the first interface hole and the plurality of through holes, and the second fan is an exhaust fan for forcing cold air in the nacelle to flow into the hub through the second interface hole and the plurality of through holes.

21. The hub cooling method of claim 20, wherein the first and the second fans are brought along to rotate by a main shaft, while the main shaft is rotating along with the rotation of the hub.

22. The hub cooling method of claim 20, wherein the hub is arranged to be activated by a plurality of blades, while the plurality of blades are disposed to be activated by an air flow.

23. The hub cooling method of claim 20, wherein the hub is formed with a hub nose, the hub nose has the circulating fan module mounted therein.

* * * * *